United States Patent [19]
Manock et al.

[11] Patent Number: 5,308,954
[45] Date of Patent: May 3, 1994

[54] HEAT SEALING APPARATUS FOR SPLICE CASE HAVING TWO HALF SHELLS

[75] Inventors: John C. Manock, Budd Lake; Antoinette D. McBride, Milford; Boyd N. Park, Morristown; Eric J. Schwab, Succasunna, all of N.J.

[73] Assignee: AT&T Bell Laboratories, Murray Hill, N.J.

[21] Appl. No.: 13,556

[22] Filed: Feb. 3, 1993

Related U.S. Application Data

[63] Continuation of Ser. No. 769,653, Oct. 2, 1991, abandoned.

[51] Int. Cl.$^5$ .......................... H05B 1/00; H05B 3/02
[52] U.S. Cl. .................................. 219/243; 156/583.1; 174/92
[58] Field of Search ................ 219/243, 221; 174/92; 156/583.1, 583.2, 583.3; 385/135, 134

[56] References Cited

U.S. PATENT DOCUMENTS

| | | | |
|---|---|---|---|
| 3,383,260 | 5/1968 | Mojonnier | 156/583.1 |
| 3,466,384 | 9/1969 | Martin | 174/92 |
| 4,135,587 | 1/1979 | Diaz | 174/92 |
| 4,169,966 | 10/1979 | Casati | 174/92 |
| 4,304,178 | 12/1981 | Haberle | 219/243 |
| 4,443,288 | 4/1984 | Sawada et al. | 156/583.1 |
| 4,680,427 | 7/1987 | John | 174/92 |
| 4,879,436 | 11/1989 | Braham | 174/92 |
| 4,885,432 | 12/1989 | Amoyal et al. | 174/92 |
| 4,948,441 | 8/1990 | Peck | 156/581 |
| 4,954,670 | 9/1990 | Jensen et al. | 174/92 |
| 5,006,197 | 4/1991 | Newkirk et al. | 156/583.1 |

FOREIGN PATENT DOCUMENTS

| | | | |
|---|---|---|---|
| 1229277 | 11/1966 | Fed. Rep. of Germany | 219/243 |
| 55-111229 | 8/1980 | Japan | 156/583.1 |
| 1-247143 | 10/1989 | Japan | 156/583.1 |

OTHER PUBLICATIONS

IBM Technical Disclosure Bulletin, "Thermal Mass Seals", R. D. Moro, vol. 11, No. 3, Aug. 1968.

*Primary Examiner*—Bruce A. Reynolds
*Assistant Examiner*—John A. Jeffery
*Attorney, Agent, or Firm*—Charles E. Graves

[57] ABSTRACT

An apparatus for making telecommunications cable closures under field conditions consists of a heating unit with a four-sided rectangular frame that mounts on slide bars which are fixedly mounted on a surface. The heating unit may be inserted under two opposing plastic shells to be welded. The shells are contained on mounts of a press unit, which consists of a frame with an open interior containing two vertical slide bars mounting an upper and lower support which hold the two mating shells. With the heating unit in position, the press unit brings the shells into contact with the heat unit to melt the shell flanges. Thereafter, the heating unit is withdrawn and the press forces the flanges together to effect the weld. The apparatus is especially useful in applying cable closures in undersea cable-laying because of the time it saves over earlier methods.

6 Claims, 7 Drawing Sheets

HEAT SEALING APPARATUS FOR SPLICE CASE HAVING TWO HALF SHELLS

This application is a continuation of application Ser. No. 07/769,653, filed on Oct. 2, 1991, now abandoned.

FIELD OF THE INVENTION

This invention relates to plastic closures and their efficient formation and, more particularly, to field-forming of reliable, inexpensive hermetic seals around cable splices and repair points.

BACKGROUND OF THE INVENTION

When deploying undersea fiber optic communication cables, it is frequently necessary to splice or join cable segments together. Examples include assembling lengths of cable long enough to traverse an ocean, or during a cable repair process. When the cable is cut and then rejoined, the structure of the cable and the splice or repair closures must withstand deep ocean hydrostatic pressure (10,000 psi), and the cable/closure dielectric properties must remain stable electrically with insulation from sea ground ($\pm 7500$ VDC) for an anticipated system life of 25 years.

The prior art teaches the encapsulation of electromechanical cable repair components by molding over the assembly and the cable jacket with a thermoplastic material of similar composition to that of the cable jacket. Once the electromechanical parts are assembled, a premolded stress-free sleeve of thermoplastic material similar in composition to that of the cable jacket is slid over the electromechanical assembly. This assembly is placed in the lower cavity of a mold. The upper mold cavity is bolted to the lower cavity to form an encapsulating mold. The mold is heated to the injection temperature. Injection takes approximately two hours. Upon completion of the injection process, the mold and the overmold material are subjected to a controlled cooling process to restore the injection material to its original composition properties. When the cooling process is complete, the mold is opened and the overmold is inspected.

The overmolding process of the prior art has several infirmities. One is that the entire closure must be heated. Further, the process requires adjunct materials such as clips, gaskets and preforms. Also, the overmolding process of the prior art does not lend itself to welding of internal walls. From 10-20 percent of the molds fail due to contaminants or air bubbles. These joints must then be cut out, replaced and remolded. The total time for the overmolding process from start to finish is on the order of three hours, assuming a good mold.

OBJECTS OF THE INVENTION

Accordingly, one object of the invention is to reduce the time needed to make a closure sealing in the field.

Another object of the invention is to provide a closure that will reliably withstand high ocean hydrostatic pressures and provide high electrical isolation from the cable power to sea guard over a prolonged time, up to 25 years.

A further object of the invention is to improve the reliability of the closure process, thereby reducing the need for splicing and resealing, and reducing the time of the closure sealing procedure.

SUMMARY OF THE INVENTION

This invention overcomes the problems of the prior art by improving on certain techniques from the art of hot plate welding, advantageously with use of pre-molded stress-free parts, to greatly reduce the need for complex molding equipment and long closure processing time.

As applied to field-forming of splice closures, the invention teaches using two polyethylene shells with formed edges. Advantageously, the joining process heats only a small section of the shells and cable surface, eliminating the need to heat (as with injection molding) the entire closure, and thereby reducing the risk of heat damage from heat applied to active components and to optical fibers in the cable. A further advantage of melting only a small fraction of the shells and cable surface is the greatly reduced chance of introduction of contaminants or voids of the plastic material, thereby producing a more reliable seal with a much lower rejection rate.

The invention and its further objects, features, and advantages will be fully understood from the detailed description to follow.

DETAILED DESCRIPTION OF AN ILLUSTRATIVE EMBODIMENT

Heating Unit Structure

Figure 1:
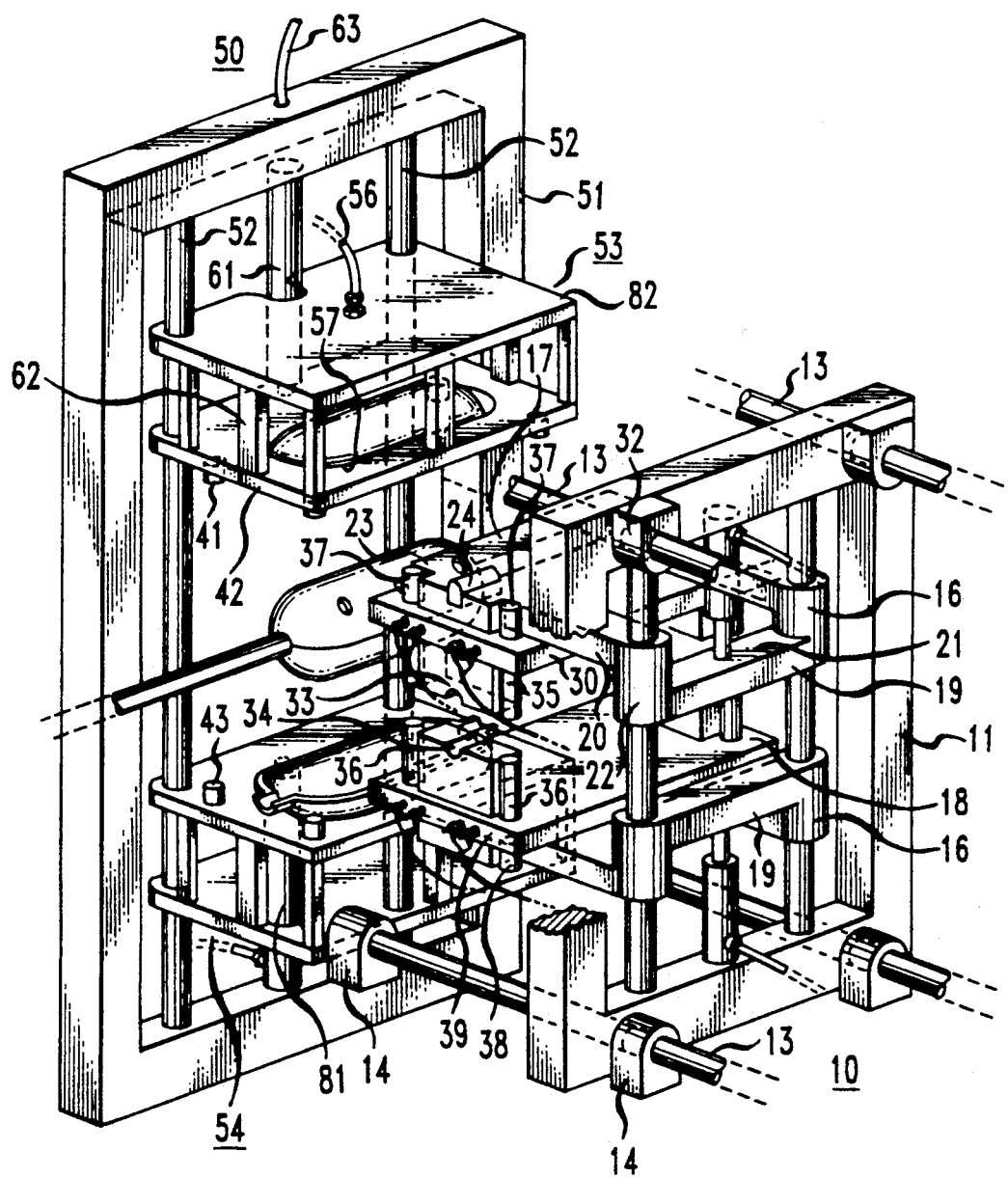
FIG. 1 is a schematic perspective rendering showing components and apparatus for practicing the invention.

FIG. 1 shows schematically apparatus for making cable closures according to the present invention. The apparatus consists of a heating unit 10 and a press unit 50. Heating unit 10 consists of a four-sided rectangular frame 11. Frame 11 slidably mounts on four horizontal slide bars 13. Each slide bar 13 is supported on two bearings 14, which are fixedly mounted on two surfaces 15 to which the press unit frame is also mounted.

Figure 4:
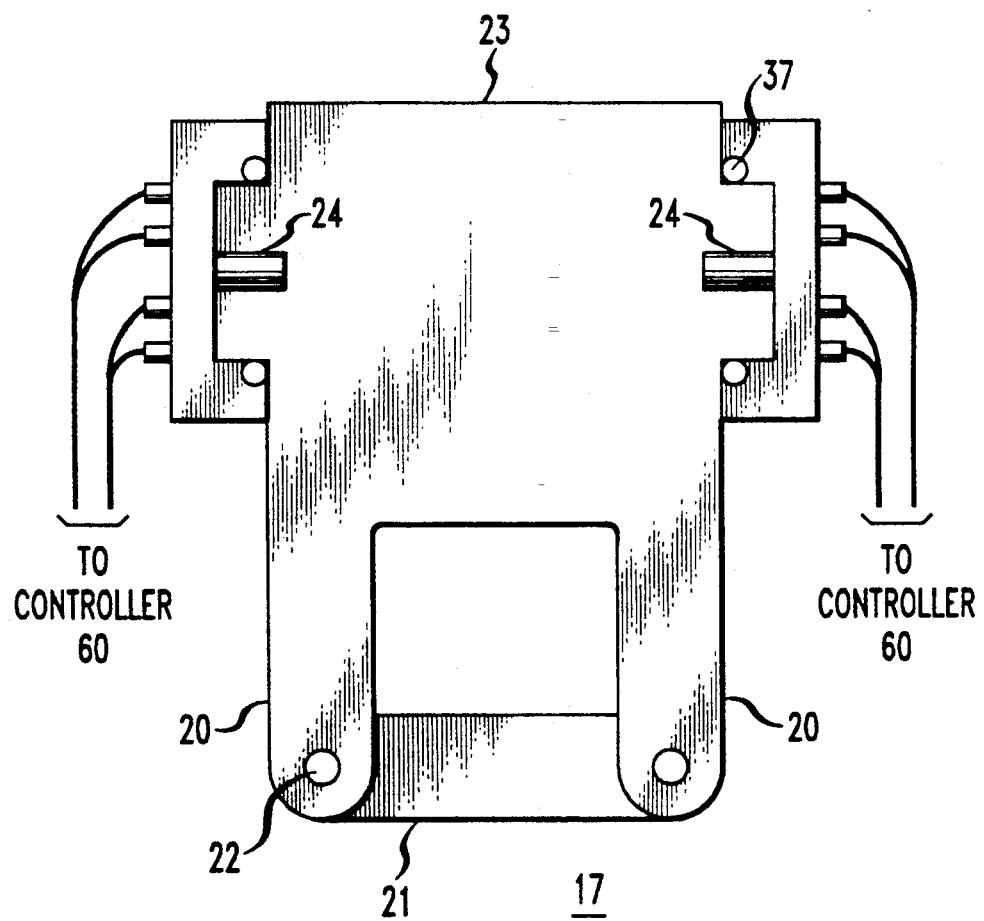
FIGS. 4 and 5 are top and bottom views of the heat platen.
Figure 5:
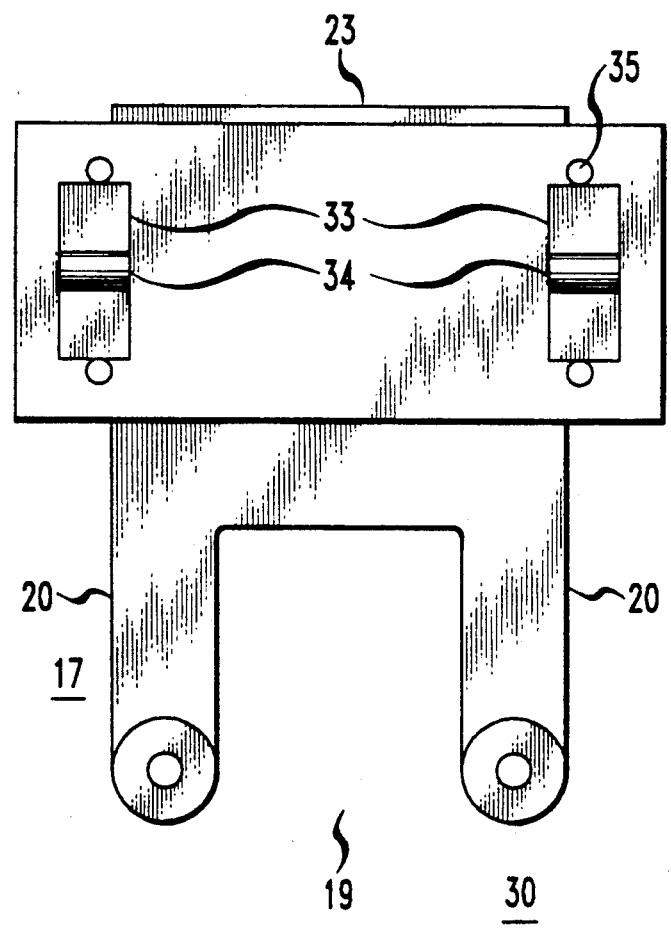

The open interior of heating unit frame 11 provides space in which to mount two parallel vertical slide bars 16. An upper and a lower heat platen 17 and 18 are slidably mounted on the vertical slide bars 16. The upper and lower heat platens 17, 18 are symmetric; and thus only the upper platen 17 will be described in detail. As shown in FIGS. 4 and 5, the slider end 19 of each heat platen consists of a pair of arms 20 joined by a bracket 21. Bore holes 22 formed through the ends of the arms 20 and the bracket 21 provide a slide bearing surface for the platens 17, 18 to move in a vertical direction on the slide bars 16. The working end 23 of upper platen 17 is provided with two semicylindrical sections 24 as seen in FIG. 4. These are a heat source for melting the interiors of end necks 29 of the shells 25, 26 preparatory to bonding. Mounted snugly onto the opposite surface 15 of upper platen 17 is a heat plate 30 containing several electrically powered heat coils 31. In response to timing actions generated by controller 60, the wires feeding heat rods 31 are energized to heat the upper platen 17.

As seen in FIG. 5, the under side 32 of heat plate 30 mounts two elements 33, each with a concave section 34 which heats the outer jacket of cable 28 when the upper and lower platens are brought together during the heating-bonding cycle.

In accordance with one aspect of the invention, a system of spacers is used to assure that the upper and lower heat platens 17, 18 do not approach one another by more than a predetermined minimum distance during the heating cycle. Travel of the heat platens towards each other therefore is limited by means such as the spacers 35 mounted on upper heating plate 30 adjacent to the elements 33, as seen in FIG. 1; and corresponding spacers 36 mounted in juxtaposed relation to the lower heating plate 39. These spacers 35, 36 are formed with a length which, when they come into contact with one another, assure that the cable surface is melted but not unduly deformed by the jaw action of the opposing elements 33.

A set of four spacers 37 are mounted on the upper surface of upper heating plate 30; and a similar set of four spacers 38 are mounted on the lower surface of lower heating plate 39. These two sets of spacers 37, 38 are respectively arrayed in opposing relation to the four spacers 41 mounted on the underside of plate 42 and the top side of four spacers 43 on plate 44.

Figure 2:
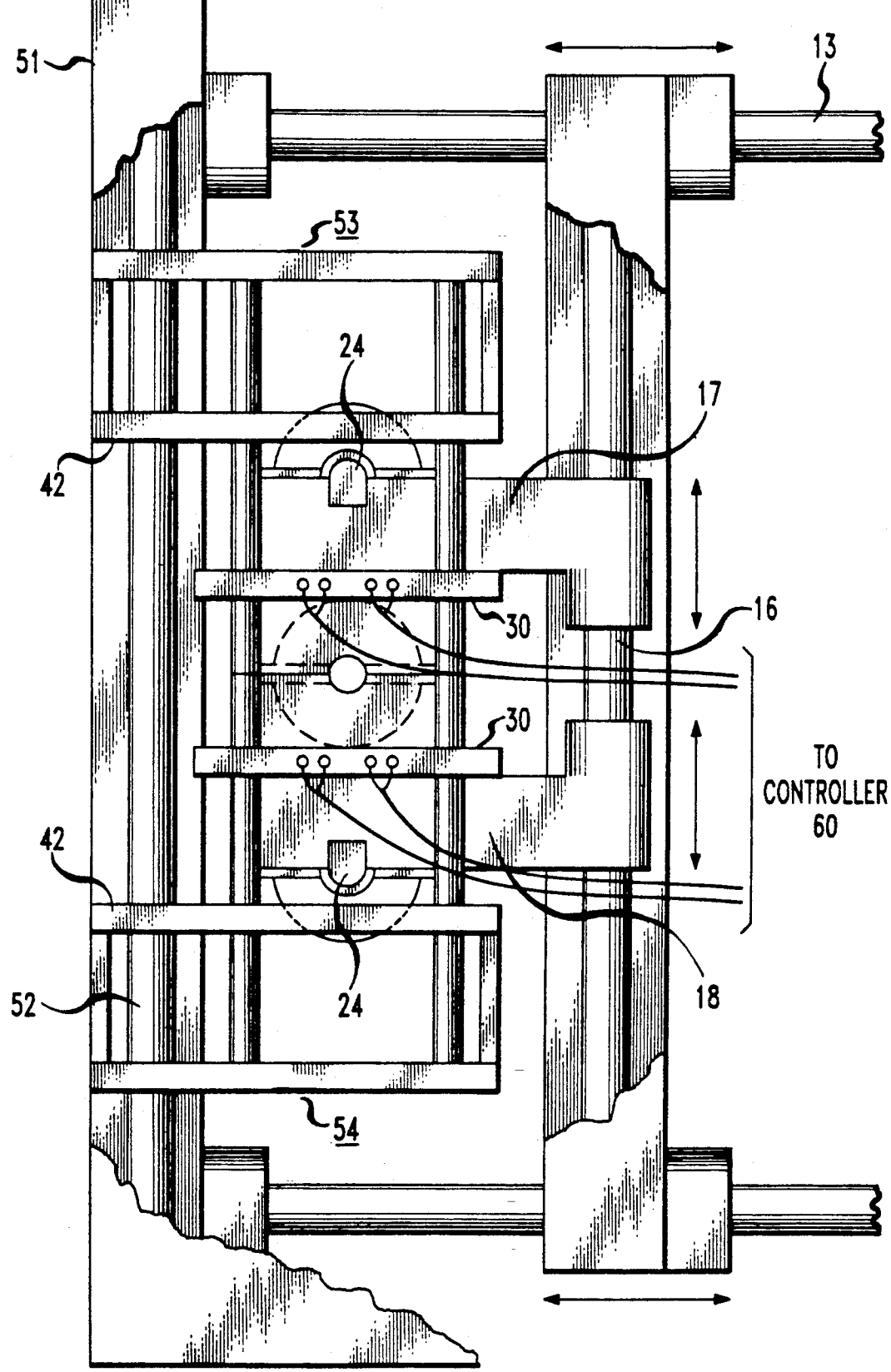
FIG. 2 is a partial side view showing position of the apparatus components during the heating step.
Figure 3:
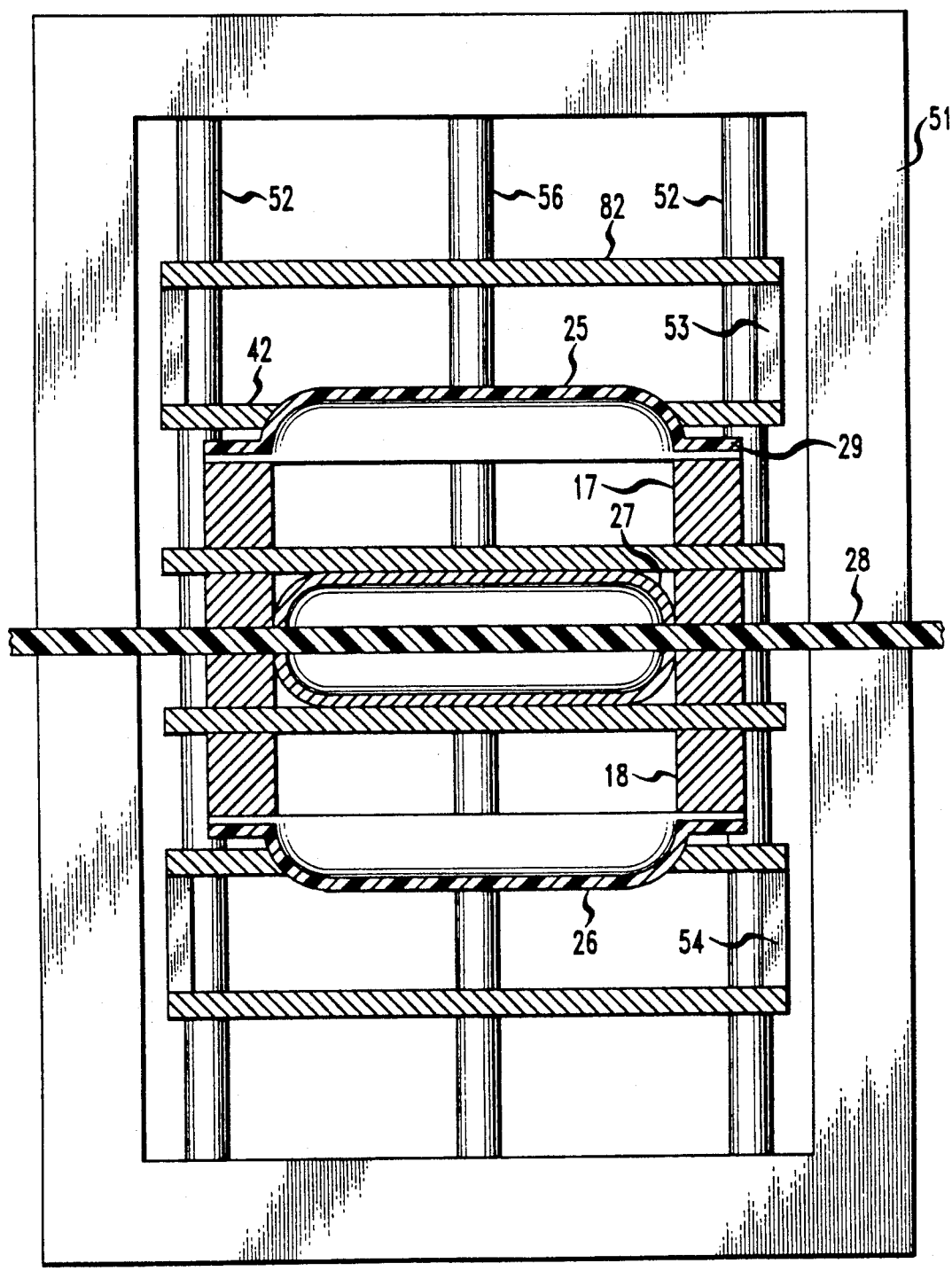
FIG. 3 is a partial front view showing position of the apparatus components during the sealing step.

Specifically, these opposing spacer sets are mechanical steps formed to a length that assures a predetermined minimum clearance between bottom surface of plate 42 and the top surface of plate 44 when these parts are brought together during the sealing step when the apparatus is in the position shown in FIG. 3. Similarly, the spacers 35, 36 are formed to a length that assures a predetermined minimum clearance between the elements 33 when brought together during the heating step when the apparatus is in the position shown in FIG. 2.

Upper platen 17 and lower platen 18 are raised and lowered into their heating and retracted positions along the slide bars 13 by a pair of hydraulic or pneumatic units 45. Units 45 are actuated through lines 46 cycially controlled by timing action of controller 60.

Press Unit Structure

As seen in FIGS. 1, 2, and 3, press unit 50 comprises a 4-sided frame 51 with an open interior containing two vertical slide bars 52. An upper support 53 and a lower support 54 slidably ride on the slide bars 52. The two supports 53, 54 are provided to hold the two mating shells of a closure, and therefore are symmetrical. Only upper support 53 will be described.

Upper support 53 consists of a first plate 82 and a second plate 42 and several ribs 62 provide rigid connection between the plates 82 and 42. plate 82 includes an entry for applying a vacuum through a line 56 which is connected to and controlled by controller 60. Second plate 42 includes an oval cutout 57, which receives a top shell 25 preparatory to bonding.

Figure 6:
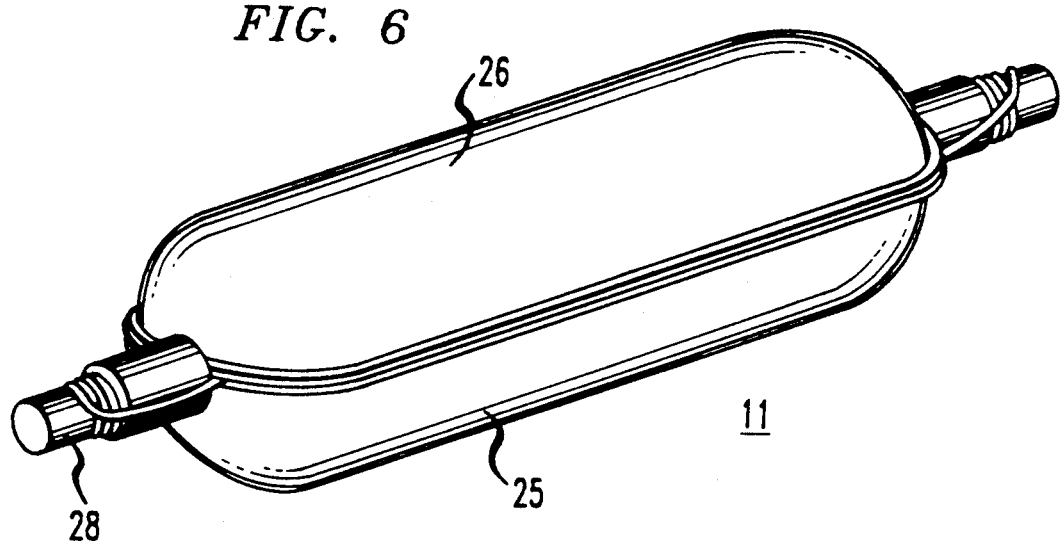
FIG. 6 is a schematic perspective view of a completed closure.
Figure 7:
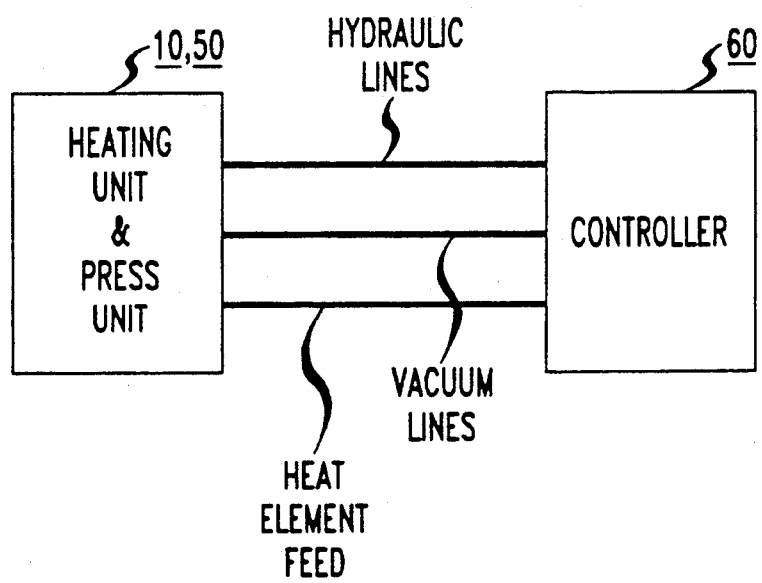
FIG. 7 is a block diagram showing at a high level the automation of the process.

The two closure shells are shown in FIGS. 6 and 7. The bottom edge 58 of cutout 57 receives the lips 59 of the cutout of the top shell of the split housing as seen in FIGS. 1 and 3. Vacuum applied to the exterior surface of shells 25, 26 retains the top shell 26 firmly on the second plate 42. A hydraulic unit 61 mounted to the interior top of frame 51 includes a piston 62 attached to second plate 42. The line 63 powering piston 61 is also controlled by controller 60.

The structure of lower support 54, which as noted is substantially the same as that of upper support 53, includes first plate 73, second plate 72, and an oval cutout 74 with edge 75 to receive the lips 76 of a lower shell 25 of the split housing 1. A hydraulic unit 81 attached to the bottom lateral portion of frame 51 provides controlled elevation and retraction of lower support 54, under direction of controller 60 seen in FIG. 8. Controller 60 is a conventional apparatus that is merely schematically illustrated to show that the overall process steps and apparatus movements can be automated. Thus, hydraulic/pneumatic lines, vacuum lines and electrical supply to the heat platens are only generally illustrated, it being volunteered that their design does not form part of the invention.

Welding Process

The upper and lower supports 53, 54 are into their retracted positions as shown in FIG. 1. The two mating shells 25, 26 are placed in the shell-receiving plates 42, 44 of the upper and lower supports 53, 54. A cable with the inner metal housing 27 of a splice closure in place is moved into position as seen in FIG. 1. The heat platens 17, 18 are pre-heated to their welding temperature while in their retracted position. Housing 27 may be applied as two shells and secured with fasteners. The platens then are moved into their welding position by sliding the frame 11 on the slide bars 13 until the platens are in vertical alignment on either side of the splice closure 27 and cable 28.

The upper and lower heat platens 17, 18 then are brought together to position the concave sections 34 of the four elements 33 onto the end necks 29 of cable jacket 28. The four opposing spacers 35 and their counterpart spacers 36 meet to limit the contact of the elements 33 against the neck 29.

Once the heat platens are in position to heat, the upper and lower supports 53, 54 are moved from their retracted position toward each other, to bring the lips 76 of the shells 25, 26 of the split housing 1 into contact with the surfaces of heat platens 17, 18. The lips and neck sections of both shells and the cable jacket are heated to the welding temperature. Then, the upper and lower supports are retracted again. Next, the upper and lower platens 17, 18 are retracted enough to allow the elements 33 to clear the necks as the heating unit frame 10 is withdrawn out from under the upper and lower supports 53, 54. These actions are rapidly effectuated using the hydraulic actuators, so that only minimal cooling of the heated parts occurs before they are pressed together to begin forming a seal.

Next, with the heating unit 10 out of the way, the upper and lower supports 53, 54 are again brought together bringing the heated lips and neck sections of the shells into contact. The four spacers 41 on the underside of plate 42 meet the corresponding four spacers 43 on the top side of plate 44, thereby limiting the force and pressure with which the two shells are welded. When the welded sections cool sufficiently, the upper and lower supports are yet again retracted and the cable with its splice closure now completed is removed for deployment.

In practicing the process it is advantageous to control several of the process parameters closely to achieve best results. First, the operating temperature of heat platens 17, 18 is determined by the melt temperatures of the polymers of the shells and cable jacket. The optimum range for typical polymers used in these applications is from 380° to 420° F.

The melt time, defined as the time during which the parts are in contact with the heated platens is determined by the desired temperature to which the areas to be welded must be raised and the desired melt depth.

The melt depth, which is the depth to which the solid material of the lips 76 is melted as measured from the original surface, determines how much plastic will be converted to molten material suitable to form the weld. This material will be displaced during the weld step, to create a bonded seal.

Related to the melt depth is the melt pressure applied to the heated shell and jacket parts by the action of bringing the platforms 53, 54 together until they reach the stops 43. A higher pressure as the polymer surfaces of the shells contact will reduce the overall process time, which is desirable.

Seal time, pressure and displacement are the parameters of interest to control the time and conditions for the heated parts of the two mating shells to cool down to solid material following heating and joining under pressure. In accordance with the invention, the shell edges are heated uniformly and to the same depth. Seal time, which the process must allow, depends on how much time the molecular chain of the particular polymer material(s) take to form to effect the desired weld.

Finally, transfer time must be minimized. Transfer time is the time between the end of the heating phase and the beginning of the seal phase. Desirably, transfer time should be on the order of a few seconds to prevent cooling before the parts are brought together. Total process time less than 15 minutes can be achieved using the present invention as opposed to 3 hours for the overmolding process of the prior art.

We claim:

1. In a cable splice closure assembly including a plastic shell-pair closure adapted to surround a splice point on a plastic-jacketed underwater cable wherein said shells have peripheral flanges, the assembly comprising:
   first means for mounting and positioning each of the two shells, comprising:
   a cooperating pair of opposed gripping means for holding the respective said shells, with said flanges extending outside of said gripping means and facing each other; and
   means for mounting said pair of gripping means for movement toward and away from each other;
   second means for heating said flanges, comprising:
   a cooperating pair of opposed two-sided heating units each comprising:
   means on a first side of each unit for heating said flanges;
   means for mounting said pair of heating units for movement toward and away from each other;
   and means for selectively positioning said heating units into vertical alignment with said shell gripping means for heating said flanges, and thereafter out of the travel zone of said gripping means for joining said flanges;
   whereby with said gripping means spaced way from each other, said heating units is inserted therebetween and clamped down onto said cable, and said gripping means are brought together to place said flanges into contact with said heating unit.

2. Apparatus in accordance with claim 1, further comprising:
   means for defining the closest point of approach of said heating units and said shell-holding gripping means, comprising opposing spacer elements disposed on said heating unit and said gripping means, whereby pressure on said flanges during heating is controlled.

3. Apparatus in accordance with claim 2, wherein said shells have semicylindrical end necks, said apparatus further comprising:
   means mounted on each said heating units for contacting the interiors of said end necks and for heating same during heating of said flanges.

4. Apparatus in accordance with claim 3, further comprising:
   means opposedly mounted on the second side of each said heating unit for heating the top and bottom portions of the area of said plastic-jacketed cable adjacent to said closure;

5. Apparatus in accordance with claim 4, further comprising:
   means for defining the closest point of approach of said heating units as said units clamp down on said cable, comprising opposing spacer elements disposed on said heating units, whereby pressure on said cable jacket during heating is controlled.

6. In a cable splice closure assembly including a plastic shell-pair closure adapted to surround a splice point on a plastic-jacketed underwater cable wherein said shells have peripheral flanges, the assembly comprising:
   first means for mounting and positioning each of the two shells, comprising:
   a cooperative pair of opposed gripping means for holding the respective said shells, with said flanges extending outside of said gripping means and facing each other; and
   means for mounting said pair of gripping means for movement toward and away from each other;
   second means for temporarily plasticizing said flanges, comprising:
   a cooperating pair of opposed two-sided heating units each comprising:
   means on a first side of each unit for heating said flanges;
   means for mounting said pair of heating units for movement toward and away from each other;
   and means for selectively positioning said heating units into vertical alignment with said shell gripping means for heating said flanges, and thereafter out of the travel zone of said gripping means for joining said flanges;
   whereby with said gripping means spaced way from each other, said heating units is inserted therebetween and clamped down onto said cable, and said gripping means are brought together to place said flanges into contact with said heating unit.

* * * * *